United States Patent [19]

Yamanaka et al.

[11] Patent Number: 4,913,757

[45] Date of Patent: Apr. 3, 1990

[54] METHOD OF PRODUCING A MAT CONSISTING OF FILAMENT LOOP AGGREGATIONS

[75] Inventors: Minoru Yamanaka, Tokyo; Tesuo Amawa, Kasukabe, both of Japan

[73] Assignee: Kabushiki-Kaisha Risuron, Tokyo, Japan

[21] Appl. No.: 180,536

[22] Filed: Apr. 12, 1988

[30] Foreign Application Priority Data

Feb. 16, 1988 [JP] Japan .................. 63-33534

[51] Int. Cl.$^4$ .................. D01D 5/22; D01D 7/00
[52] U.S. Cl. .................. 156/167; 156/169; 156/181; 156/244.26; 264/168; 264/177.13; 264/178 F; 264/180; 264/211.14; 264/562
[58] Field of Search .................. 264/168, 40.7, 178 F, 264/211.14, DIG. 75, 177.13, 180, 562, 570; 156/167, 181, 244.26, 244.27, 169

[56] References Cited

U.S. PATENT DOCUMENTS

| | | | |
|---|---|---|---|
| 3,686,049 | 8/1972 | Manner et al. | 264/168 |
| 3,687,759 | 8/1972 | Werner et al. | 264/168 |
| 3,691,004 | 9/1972 | Werner et al. | 264/168 |
| 3,837,988 | 9/1974 | Hennen et al. | 264/168 |
| 3,852,152 | 12/1974 | Werner et al. | 264/168 |
| 3,936,337 | 2/1976 | Stapp | 264/168 |

FOREIGN PATENT DOCUMENTS

| | | |
|---|---|---|
| 0919371 | 1/1973 | Canada . |
| 4714347 | 4/1972 | Japan . |
| 6285061 | 4/1987 | Japan . |

Primary Examiner—Hubert C. Lorin
Attorney, Agent, or Firm—Ladas & Parry

[57] ABSTRACT

A method of producing a mat consisting of filament loop aggregations. The first step is that of forming a first filament loop aggregation low in the filament density wherein many filaments are made. These by extruding a thermoplastic synthetic resin out of a T-die and arranging the resin longitudinally and laterally at intervals for continuous molding. The resin is deposited on a boiling water surface. The filament temperature is maintained close to the temperature at the time of molding by heating while the filament bundle is vertically lowered toward a cooling water surface and is sunk into water in the vertical direction. It is lowered at a speed less than the filament extruding molding speed, while a high density thermoplastic synthetic resin layer is conveyed under heating by a conveyer controlled to be at a feeding speed equal to the sinking speed in water of the above mentioned filament loop aggregation and is sunk into the cooling water along the outside of the filament loop aggregation at the delivery end. The filament loop aggregation and thermoplastic synthetic resin layer are fused together on their contact surface.

12 Claims, 2 Drawing Sheets

METHOD OF PRODUCING A MAT CONSISTING OF FILAMENT LOOP AGGREGATIONS

BACKGROUND OF THE INVENTION

This invention relates to a method of producing a mat consisting of filament loop aggregations, which is a coarse net-like developed resilient mat produced through a complicated entanglement of synthetic resin monofilaments. More particularly it is a method of producing a mat consisting of filament loop aggregations adopted for a porch mat of fixed dimentions or a floor mat formed and laid in a long sheet.

Instead of a conventional carpet mat or synthetic resin mat, there is recently provided a three-dimensional net-like mat consisting of synthetic resin monofilaments which dry quickly and which are water permeable. Due to characteristics such as resiliency and weather-proofness, such three-dimensional net-like mats are used in many indoor and outdoor areas, and particularly in places where water is present such as, an inlet and outlet of a bathroom or a pool side. These mats are advantageous because they are simple to wash and dry.

Also, as this kind of three-dimensional mat has an, sand and gravel from shoes etc. will drop down through the mat and will not remain on the surface thereof. As water or the like also will drop down through the mat, the mat surface can be always kept dry. It is thus convenient.

In addition, when an elastic sheet such as a synthetic resin sheet, foaming sheet or rubber sheet is pasted to the lower surface of such mat, the cushioning property of the mat will be increased, and the sand and water dropping into the mat will be received by this sheet, thereby keeping the floor thereunder clean.

DESCRIPTION OF THE PRIOR ART

As disclosed in the gazette of a Japanese patent publication No. 14347/1972, such three-dimensional net-like mats are formed as a non-woven fabric wherein many monofilaments made of a thermoplastic synthetic resin are laminated while being rubbed and bent. The filaments are fused at their contact points and are cooled until solidified.

The formation of upright loops disclosed in the gazette of a Japanese patent publication No. 31222/1980 and a Japanese patent laid open No. 85061/1987 is known as a web forming means of the above mentioned filaments in such non-woven fabric.

Now, in the non-woven fabric formation by the above described conventional means, in such rubbed and bent web formation, the resiliency of the individual rubbed and bent filament part itself is low. The rubbed and bent filaments by this producing means overlap on each other to fall down and, as a result, as the entangled density of the filaments becomes higher, the resiliency of the sheet will be lost.

Thus, when the mat is used, the treading resistance will be diminished and, when the mat is stored or carried, it will be difficult and therefore inconvenient to roll up the sheet-like mat.

On the other hand, when the web formation is made loop-like, the resiliency of the filament itself in each loop-like part will be developed but, in the web made of arcuate loops arranged in a substantially fixed form, the respective loops are only fused at their intersecting points and the contact points between the adjacent loops, are quite independent of each other. Thus the loops are not very resilient.

SUMMARY OF THE INVENTION

The present invention has it as an object to provide a mat wherein a filament web is formed of closed loops to develop filament resiliency in each loop, the degree of fused contact between the respective loops being high to provide strong resiliency.

DESCRIPTION OF THE DRAWINGS:

The many advantages and features of the present invention can be best understood and appreciated by reference to the accompanying drawings wherein.

DETAILED DESCRIPTION OF THE INVENTION

Figure 1:
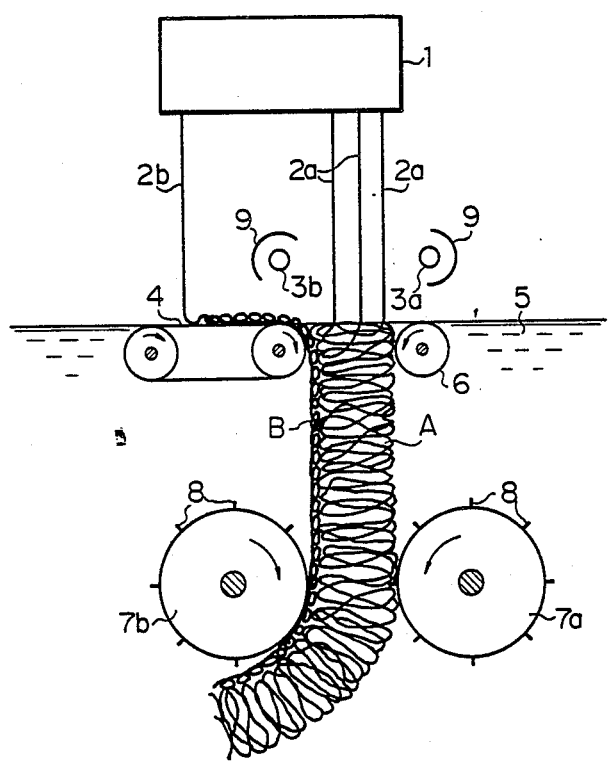
FIG. 1 is a side view of an essential part showing an embodiment of the apparatus of the present invention.

According to the present invention, a mat is made by overlapping a three-dimensional aggregation of upright disarranged loop-like synthetic resin filaments and a synthetic resin layer having very few clearances or no clearance. There are many spaces within the three-dimensional aggregation of the filaments to develop a cushioning property.

In order to produce such mat, several hot filaments of a thermoplastic synthetic resin are pressed and extruded through T-die orifices and are made to fall toward a water surface.

The falling hot filaments are heated as they fall from the die to the water by such heat sources as ceramic infrared ray heaters so as not to be cooled by the atmosphere.

Such hot filaments form into coiled loops on the water surface. Unless the filaments are hot, the loops will become large. Further, in the filaments of a reduced temperature, no coiled loop will be formed but only a channeled rubbed and bent form will be able to be made.

The height from the die mouth end to the water surface is 5 to 100 cm. and the heat reduction of the filaments is prevented by making the die mouth end approach the water surface as much as possible.

The orifice diameter of the T-die is 0.3 to 1.5 mm. and is an element which determines the end filament diameter taking into consideration shrinkage of the material after extrusion and molding at the time of hardening. In this way resiliency and durability of the formed filaments is retained and permanent setting is prevented.

A mat sheet consisting of filament aggregations of respective widths can be made by arranging the numbers of orifices corresponding to the widths of 90, 120 and 150 cm. of intended mat sheets with an orifice arrangement of a T-die of 2 to 6 longitudinal rows at the intervals of 3 to 5 mm. and a pitch of 3 to 5 mm. in the lateral rows.

That is to say, a hot first filament bundle extruded out of the T-die of such orifice arrangement is made to fall upright toward cooling water and is received by submerged rolls of a rotary peripheral speed slower than the falling speed of the filament to limit the falling speed of the filament in water and to give the filaments a resistance toward the water surface from the above mentioned rollers. Loops having a peripheral length of the filament length corresponding to the difference between the extruding speed of the respective filaments and the falling speed in water will be sequentially and continuously created to form a coil-like first filament loop aggregation.

In the same manner, a second filament bundle falling toward a conveyer present on the water surface will be prevented by this conveyer from sinking into the water and will form loops on the water surface to form a second filament loop aggregation consisting of overlapped coiled loops controlled by the conveying speed of the conveyer.

At this time, in order to make it easy to form loops in the first filament loop aggregation and to make bent irregular loops, it is effective to keep boiling the cooling water surface on which the filament bundle falls.

This boiling state vibrates the respective filaments wound on the water surface. As a result, entangled disarranged coiled loops will be created in the filament on the water surface.

In order to maintain the boiling state on this water surface, it is important to keep the filaments coming out of the T-die at a high temperature until they contact the liquid level. Generally, when the filaments are in contact with the atmosphere, the filament temperature will be quickly reduced. The water surface will be in the boiling state, heated by the filament bundles falling in the water, (the filament bundles being kept at a filament extruding molding temperature of 200° to 150° C. by the above mentioned heating treatment). Therefore, when the cooling water is kept at a high temperature of 60° to 80° C., this boiling will be made positive.

When the filaments are molded to be coiled loops while kept at a high temperature, the fusing between the loops will be accelerated. Further, when the cooling water is at a high temperature, in case the molded loops are pulled out into the atmosphere by the guide roller and are sent to the secondary process, they will be able to be easily dried with cool or hot air.

A filament loop aggregation in which the coil density is made coarse is accomplished by increasing the rotation (pulling speed in water) of the roller in water and the conveyer speed synchronized with it and is made high by reducing the pulling speed.

On the other hand, even if the thickness width of the hanging first filament bundle is not regulated, a three-dimensional formation of coiled loops will be made but the size of the loops formed on the liquid surface will not be constant. Therefore, a means of regulating the thickness width of the filament bundle functions effectively to form an intended uniform thickness coiled loop aggregation.

For the second filament loop aggregation fed onto and outside of the first filament loop aggregation, a guide roller is located just below the water surface outside of the first filament loop aggregation to regulate the position of the first filament bundle as it sinks and becomes looped and therefore the thickness width of the filament bundle in the position on the water surface just above the guide roller will be regulated as related with the regulation below the water surface.

Such first and second filament loop aggregations are processed in two parallel places and the above mentioned first aggregation is formed along one side surface of the above mentioned second aggregation.

In such formation, when the above-mentioned second aggregation is heated on the side surface to near fusing temperature, the filaments on the side surface will soften to make a synthetic resin layer of a high density by the lateral fall of the loops.

Therefore, this synthetic resin layer may be the second filament loop aggregation formed in advance a synthetic resin back sheet or net-sheet.

In molding synthetic resins, the general temperature of the cooling bath is about 50° C. for PE (polyethylene) and PP (polypropylene), about 10° to 40° C. for PVC (polyvinyl chloride) and about 85° C. for PS (polystyrene).

The surface tension of water on PVC (polyvinyl chloride) is so high as to be about 60 to 70 dym./cm. that fine filaments of an outside diameter less than 1 mm. will be overlapped in turn above the water surface, the coiled loops formed here will be laminated in several steps and will be cooled in water and therefore the object aggregations coarse in the loop clearances will not be obtained. Therefore, in order to sequentially sink the coiled loops by the filament bundle on the liquid surface, it is effective to add a surface active agent reducing the surface tension of the cooling bath.

Embodiments of the present invention shall be explained in the following:

Embodiments:

FIG. 1 is a side view showing component parts in an optimum apparatus for embodying the present invention. Two sets of filaments 2a and 2b are to fall vertically toward cooling water 5 while being molded in the thickness direction (longitudinal direction) from a T-die 1 extruding a thermoplastic synthetic resin material under pressure.

In the lateral direction (front to back direction of the paper surface) of the T-die in this case, many filaments 2a and 2b are to be molded as arranged at predetermined intervals (pitch of 3 to 5 mm.) in the length zone corresponding to the lateral width of an intended molding.

A conveyer 4 present on the water surface is arranged in the falling zone of the filaments 2b and is to be driven at a conveying speed equal to the later described comparatively slow water sinking speed of the filament loop aggregation.

On the other hand, in the falling zone of the filaments 2a, bar-like ceramic infrared ray heaters 3a and 3b are arranged together with reflecting plates 9 so as to be heating sources.

On the falling water surface of the filaments 2a, a guide roller 6 is arranged at a predetermined spacing from the delivery end of the above mentioned conveyer 4 so that the bundle of the filaments 2a may fall on the water surface in this clearance and may be led by this roller 6 to sink down.

A pair of feeding submerged rollers 7a and 7b rotated and driven at a constant speed are arranged in water to hold and contact the bundle of the filaments 2a having sunk in the above mentioned water and move it in the cooling water 5. Engaging pins 8 are located at intervals on the peripheral surfaces of the submerged rollers 7a and 7b. As the rotating peripheral speed of these rollers 7a and 7b (which rotate at a constant speed) is set to be lower than the falling speed of the filaments 2a, the filaments 2a falling at a high speed from the T-die 1 will be decelerated in sinking in water by the above mentioned submerged rollers 7a and 7b and, as a result, will be relaxed by the filament length corresponding to the difference between the falling speed and sinking speed. These relaxations will concentrate in the water surface zone due to the buoyancy of the filaments 2a of a small specific gravity. As a result, the filaments 2a will form loops on the water surface.

That is to say, the filaments 2a extruded out of the T-die will reach the water surface of the cooling water 5 while being kept near their extrusion molding temperature by the above mentioned heaters 3a and 3b in the falling zone in air. The filaments 2a once sunk in the cooling water 5 will quickly drop in temperature and will harden. However, these hardened filaments 2a will be regulated in the pulling amounts by the submerged rollers 7a and 7b stopped in sliding by the engaging pins 8, therefore the hardened parts in water will be subjected to resistances from the rollers 7a and 7b in water and thereby the soft filaments 2a still at a high temperature just before reaching the water surface will be curved and will be gradually pulled into water while describing loops to form coiled loops.

When the temperature within the bath of this cooling water 5 is kept at 60° to 80° C., the cooling water 5 in the falling position will be locally boiled by heating by the filaments 2a reaching the water surface while at a high temperature. By this boiling activity, the water surface of that part will be rough and therefore the filaments 2a describing loops on this water surface will be waved and disarranged in response to the action of the water surface.

Therefore, the total surface contact between the adjacent loops overlapped on the water surface will be interrupted by the concave-convex portions of the disarranged loops formed and the contact point parts will be comparatively many.

In such points of contact, the loops will be fused with each other and will cooled to be hardness. Therefore, coiled loops having comparatively speaking many fused parts between adjacent loops will be continuously formed in turn and a filament loop aggregation A in which coiled loops $a_1$ are cross-linked longitudinally and laterally with loop edges overlapping between adjacent filaments 2a will be formed.

On the other hand, the other corresponding filaments 2b will form on the falling water surface loops by the filament length corresponding to the difference from the extruding, molding and falling speed and the conveying speed of the conveyer 4 equal to the sinking speed of the filament loop aggregation A regulated by the above mentioned submerged rollers 7a and 7b and will be transmitted toward the falling zone of the above mentioned filaments 2a while being laminated in turn to be coiled on the conveyer 4. A filament loop aggregation B high in filament density will be formed by being fused in the coiled loop overlapping parts by heating by the above mentioned heater 3b while the filaments 2b on conveyer 4 will be softened on the surface, conveyed to the delivery end of the conveyer 4, and will sink into the cooling water 5.

The sinking zone in water of this aggregation B is located on and outside of the falling zone of the above mentioned filaments 2a. The filaments 2a falling between the aggregation B and the guide roller 6 on the opposite side will be regulated in thickness and width by the aggregation B and guide roller 6. Therefore, the size of the loops will be formed to be substantially constant and the softened surface of the above mentioned aggregation B and the loops on one side of the aggregation A will be fused together.

Thereby, there is formed a mat material wherein the second filament aggregation B (in the laterally fallen direction) which is high in the density is overlapped on one side surface of the first filament aggregation A (in the upright direction).

Figure 2:
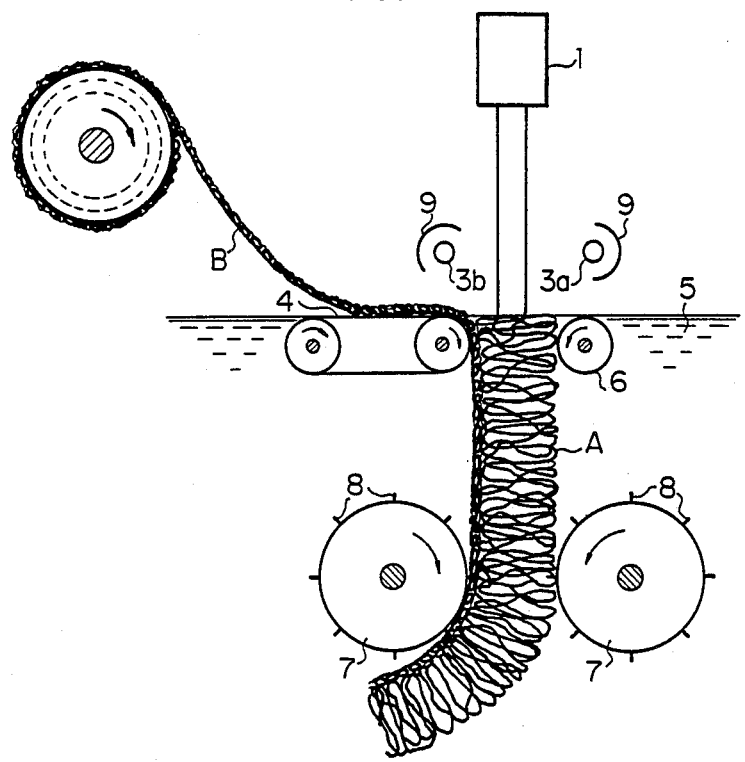
FIG. 2 is a side view of an essential part showing another embodiment of the method of the present invention.

As another embodiment, the above mentioned high density second filament aggregation B need not always be formed simultaneously parallel with the aggregation A. As shown in FIG. 2, the aggregation B formed in advance may be fed onto the conveyer 4. As of a thermoplastic synthetic resin of a high density, a back sheet made of a synthetic resin film or net-sheet made of synthetic resin may be fed instead of this aggregation B. In the embodiment shown in the above mentioned FIG. 2, the same mechanism parts as in the embodiment shown in the above mentioned FIG. 1 shall bear respectively common reference numerals.

In these respective embodiments, the conveyer 4 has its conveying surface set to be substantially flush with the water surface but may be arranged to have its conveying surface somewhat inclined to be submerged at the delivery side tip.

In order to pull the coiled loops formed on the cooling water surface into the water without disturbing their form, a surface active agent is added into cooling water 4.

| Amounts of addition of the surface active agents per 100 parts of water | | |
|---|---|---|
| Anion system: | Alkylbenzenesulfonate | 1 to 0.2 part |
| | Dialkylsufosuccinate | 1 to 0.05 part |
| Nonionic system: | Polyoxyethylene nonylphenol ether | 1 to 0.1 part |

It is effective to add 0.05 to 0.2% dialkylsulfosuccinate which in small quantities is highly capable of reducing surface tension and in the connecting effect.

Now, in this kind of apparatus, in order to keep constant the cooling bath level, cooling water is circulated with a pump while being overflowed. In such case, many bubbles will be generated in an auxiliary tank level detecting electrode and cooling bath and will be disadvantageous in molding. In this respect, at the above mentioned effective component concentration of the dialkylsulfosuccinate, many bubbles tend to be generated. Therefore, it can be said to be optimum to add and use preferably 0.05 to 0.2% dialkylsulfosuccinate.

The mat material consisting of the thus formed filament loop aggregations A and B may be coated with a plastisol made of the same material mixture as of the filament to prevent the bonding strength reduction and to permanently set the filament loops.

Figure 3:
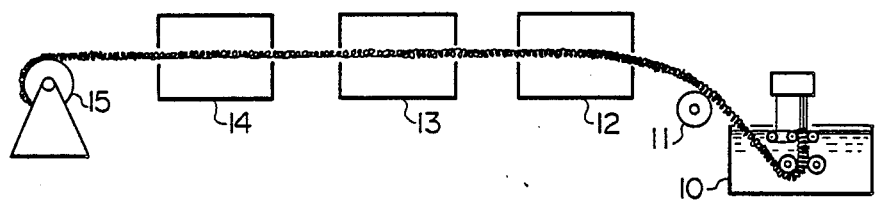
FIG. 3 is a sheet producing process block diagram by using the method of the present invention.

The apparatus formation therefor is shown in FIG. 3. An aggregation A pulled up from a bath 10 of the above mentioned cooling water 5 is fed into a primary dryer 12 by a feeding roller and is dried at a low temperature. In this drying, the aggregation A is still about 70° C. by the cooling water 5 at a high temperature. Therefore, the water can be comparatively easily and positively removed by blowing warm wind or the like.

The dried aggregation A is fed into a surface coating process part 13 by the above mentioned plastisol, is processed in the part 13 by such means as blowing, painting or dipping, is then fused by high temperature drying in a secondary dryer 14 and is wound up on a winder 15. A back sheet comprised of resin, foam, rubber or net may be used to bond to the back surface of this aggregation A. The choice of backing will turn on the intended end use of the mat.

| (Formation Example 1) | |
| --- | --- |
| Polyvinyl chloride (PVC)(P-1300) | 100 parts |
| Plasticizer DOP Dioctyl phthalate | 50 parts |
| Stabilizer Dibutyl tin laurate | 2 parts |
| Stabilizer Cadmium stearate | 0.6 part |
| Stabilizer Barium stearate | 0.4 part |
| Coloring agent | 0.1 part |

A compound material of the above mentioned mixture is molded to be filaments by an extruding molder.

The distance between the conveyer 4 below the cooling water surface and the guide roller 6 is set to be 15 mm. The distance between the guide roller 6 and submerged roller 7a is 9 mm. The filament molding orifice diameter of the T-die 1 is 0.8 mm. The T-die orifice arrangement is of four longitudinal rows. The clearance between the filament 2b orifice and filament 2a orifice is 50 mm. The clearance between the filaments 2a is 4 mm. Their lateral orifice pitch is 5 mm. The distance between the T-die and cooling water surface is 5 cm.

The die temperature is 185° C. The die pressure is 90 kg./cm². The extruding pressure is 190 kg./cm². The cooling water temperature is 60° to 80° C. The guide panel temperature is 120° C. Two ceramic infrared ray heaters of 2.5 KW each are used. At a molding linear speed of 2 m. per minute, loops at a speed of 40 cm. per minute can be made.

In this formation, by only holding the filament bundle in its thickness width direction with the guide rollers, the front and back surfaces of the aggregations can be made uniform and a mat of a filament diameter of 1 mm., loop size of 5 to 10 mm. and thickness of 14 mm. is obtained and is made a product through drying and bonding steps.

(Formation Example II)
When, in the conditions of Formation Example I,
the filaments 2b are in two rows at a spacing of 4 mm.,
the filaments 2a are in two rows at a spacing of 4 mm. and
the distance between the filaments 2a and 2b is 45 mm,
a thick mat of the above mentioned second aggregation layer B part of a filament diameter of 1 mm., loop size of 5 to 10 mm. and thickness of 14 mm. is obtained.

(Formation Example III)
When, in the conditions of Formation Example I,
the filaments 2b are in two rows at a spacing of 4 mm.,
the filaments 2a are in two rows at a spacing of 4 mm.,
the distance between the filaments 2a and 2b is 45 mm. and
the distance between the conveyer 4 and guide roller 6 is 17 mm.,
a thick mat of a filament diameter of 1 mm., loop size of 5 to 10 mm. and thickness of 16 mm. is obtained.

(Effects of the Invention)
Thus, according to the method of the present invention, an aggregation is formed of irregularly formed loops by winding filaments in a coil-like fashion. The individual closed loops provide a high degree of filament resiliency. They are of irregular wavy form and are therefore exhibit a high degree of fused contacts between the adjacent continuous coiled loops and between the loop forming filaments arranged longitudinally and laterally. Thus a highly bonded mat is obtained. In the aggregation part in which such loops are formed in the upright direction, in addition to the resiliency of the above-mentioned loops themselves, a stiff mat resiliency can be obtained by the strength of the bond between these loops. The high density thermoplastic synthetic resin layer is high in strength, particularly, in the tensile strength. Therefore, according to the method of the present invention, there can be obtained a highly resilient mat having excellent tensile strength for optimum usage as for a porch mat or floor sheet. This mat will be very resilient.

When the diameter of the filament in this case is set to be in the range occurring when filament loop aggregation is high per filament density, the practical strength of the filament loop can be obtained. On the other hand, the mat can be made high in the sheet weight convenient to the setting work and in the treading touch.

When the diameter of the loop of an irregular form is adjusted to be in the range occurring when filament loop aggregation is high per filament density, it will be effective in keeping the mat elasticity. If on the other hand, the diameter of the loop is too large, a shoe tip or the like may catch on it. Thus, it is not preferable.

In the method of the present invention, the filaments are lowered onto the water surface while near the molding temperature. This water surface is in motion due to boiling. Thus the loops formed on the water surface will be formed irregularly and will be contact-fused in the loop intersecting parts and between the loops.

When the second filament loop aggregation is made, the second loop being a high density thermoplastic synthetic resin layer formed simultaneously with and in parallel with the formation of the above described first filament aggregation which is low in filament density, the above mentioned long mat material can be continuously formed. However, the above-mentioned second aggregation or back sheet material can be formed in advance or a net-sheet may be used.

Additionally, when the filament bundle falling toward the cooling water surface is regulated in width and thickness, the sizes of the respective loops formed from these filaments will be uniform and, when the contracted width is controlled, the formation of combining the above described upright directed loops and laterally fallen loops will be able to be freely made.

If the distance from the T-die to the cooling water surface is long, the filament temperature will be reduced by the air through which it passes. Therefore, it is desirable to set the distance to be as short as possible. However, if the distance is too short, the loop formation on the water surface will be disturbed. Therefore, this distance of 5 to 10 cm. is effective.

By keeping the temperature of the cooling water at a comparatively high temperature of 60° to 80° C., a boiling state in which the water surface on which the filaments fall is properly waved by heating by the filaments submerging into water can be automatically obtained. In order to smoothly sink the filaments to prevent the loop forms from being disturbed, it is effective to add a surface active agent.

What is claimed is:
1. A method of producing a resilient mat having a plurality of bonded filament loops, said method comprising the steps of:
extruding a plurality of resin filaments such that they fall toward a cooling liquid;

heating said filaments as they fall toward said cooling liquid to keep said filaments at least close to their extrusion temperature;

maintaining the surface of said cooling liquid in a boiling state such that upon contact of said filaments with said surface, said filaments are caused to wave and bond more than would occur absent said boiling surface;

facilitating the sinking of said filaments below said boiling surface, the sinking of said filaments occurring at a slower rate than the dropping of said filaments into said cooling liquid;

conveying by means of a conveyor located near the surface of said cooling liquid a portion of said filaments prior to their sinking, said conveyor acting to cause the waving and bonding of said portion of said filaments to be different than the waving and the bonding which occurs with respect to those filaments not conveyed, said conveyed filaments ultimately bonding with those filaments that are not conveyed; and wherein in said facilitating step, a directing roller is placed below and near said surface of said cooling liquid and opposite said conveyor, said directing roller serving to direct said filaments below said surface of said cooling liquid as well as limit the width of said filaments as they bond together to the width defined between said conveyor and said directing roller.

2. The method of claim 1 wherein said facilitating step includes adding about 0.05 to 0.02% surface active agent dialkylsufosucinate to said cooling liquid.

3. The method of claim 1 wherein said resin filaments are extruded out of a T-die.

4. The method of claim 1 wherein said roller acts to limit the density of said filaments.

5. The method of claim 1 where there are two pulling rollers below said surface, said pulling rollers acting to connect with and pull said filaments downwardly at a predetermined speed.

6. The method of claim 5 wherein said pulling rollers are located below said directing roller and said conveyor.

7. The method of claim 2 wherein said cooling liquid is held at a temperature of 60 to 80 degrees centigrade such that the surface of said liquid is kept boiling by contact with the heated filaments.

8. The method of claim 2 wherein said heating step involves maintaining said filaments at a temperature of between 150 to 200 degrees centigrade.

9. The method of claim 7 wherein said filaments are dropped through a distance of between 5 to 100 centimeters before reaching said liquid surface.

10. The method of claim 8 wherein said filaments are dropped through a distance of between 5 to 100 centimeters before reaching said liquid surface.

11. The method of claim 1 wherein the conveyed filaments are denser than those filaments which are not conveyed.

12. A method of producing a resilient mat having a plurality of bonded filament loops, said method comprising the steps of:

extruding a plurality of resin filaments such that they fall toward a cooling liquid;

heating said filaments as they fall toward said cooling liquid to keep said filaments at least close to their extrusion temperature;

maintaining the surface of said cooling liquid in a boiling state such that upon contact of said filaments within and on said cooling liquid, said filaments are caused to wave and bond more than would occur absent said boiling surface;

facilitating the sinking of said filaments below said boiling surface.

* * * * *